(12) United States Patent
Sugimoto

(10) Patent No.: US 11,336,131 B2
(45) Date of Patent: May 17, 2022

(54) STATOR AND ELECTRIC MOTOR EQUIPPED WITH STATOR

(71) Applicant: FANUC CORPORATION, Yamanashi (JP)

(72) Inventor: Yasunori Sugimoto, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 183 days.

(21) Appl. No.: 16/846,175

(22) Filed: Apr. 10, 2020

(65) Prior Publication Data

US 2020/0358324 A1    Nov. 12, 2020

(30) Foreign Application Priority Data

May 7, 2019    (JP) .............................. JP2019-087416

(51) Int. Cl.

| | |
|---|---|
| *H02K 1/14* | (2006.01) |
| *H02K 1/16* | (2006.01) |
| *H02K 3/52* | (2006.01) |
| *H02K 3/32* | (2006.01) |
| *H02K 1/18* | (2006.01) |
| *H02K 1/17* | (2006.01) |
| *H02K 9/00* | (2006.01) |

(52) U.S. Cl.
CPC ............ *H02K 1/146* (2013.01); *H02K 1/16* (2013.01); *H02K 1/17* (2013.01); *H02K 1/187* (2013.01); *H02K 3/325* (2013.01); *H02K 3/522* (2013.01); *H02K 9/00* (2013.01)

(58) Field of Classification Search
CPC ............ H02K 1/146; H02K 1/16; H02K 1/17; H02K 1/187; H02K 3/522; H02K 1/165
See application file for complete search history.

(56) References Cited

U.S. PATENT DOCUMENTS

| | | | | |
|---|---|---|---|---|
| 2,596,711 A | * | 5/1952 | Robertk ................ | G05B 11/011 310/49.43 |
| 3,081,412 A | * | 3/1963 | Granier ................. | H02K 1/165 310/216.091 |
| 3,909,647 A | * | 9/1975 | Peterson ................ | H01F 1/086 310/156.12 |
| 4,504,755 A | * | 3/1985 | Semones ............... | H02K 1/2773 310/156.23 |
| 4,633,114 A | * | 12/1986 | Reynolds ............... | H02K 3/522 310/194 |

(Continued)

FOREIGN PATENT DOCUMENTS

JP    2009-528811 A    8/2009

*Primary Examiner* — Robert W Horn
(74) *Attorney, Agent, or Firm* — Nakanishi IP Associates, LLC

(57) ABSTRACT

A stator of an electric motor has a cylinder-shaped stator core. First core teeth and second core teeth are alternately arranged in the circumferential direction on the inner peripheral surface of the stator core. The second core teeth each have a cross-sectional shape perpendicular to the central axis of the stator core different from the cross-sectional shape of the first core tooth. A coil is assembled to the first tooth. The coil is assembled to one of the first core tooth and the second core tooth. The width of the second core tooth is reduced with a step of a curved surface at a boundary between the tip end portion and a portion behind of the tip end portion.

11 Claims, 11 Drawing Sheets

(56) References Cited

U.S. PATENT DOCUMENTS

| | | | | |
|---|---|---|---|---|
| 7,352,099 B2* | 4/2008 | Schunk | ............... | H02K 1/146 |
| | | | | 310/216.004 |
| 7,859,160 B2* | 12/2010 | Vollmer | ............... | H02K 3/12 |
| | | | | 310/184 |
| 7,990,014 B2* | 8/2011 | Clark | ............... | H02K 1/165 |
| | | | | 310/216.069 |
| 8,102,093 B2* | 1/2012 | Prudham | ............... | H02K 29/03 |
| | | | | 310/216.071 |
| 8,415,855 B2* | 4/2013 | Li | ............... | H02K 21/14 |
| | | | | 310/216.074 |
| 8,766,506 B2* | 7/2014 | Sano | ............... | H02K 1/146 |
| | | | | 310/216.073 |
| 9,373,982 B2* | 6/2016 | Wu | ............... | H02K 3/12 |
| 10,164,486 B2* | 12/2018 | Hyppias | ............... | H02K 1/146 |
| 10,693,334 B2* | 6/2020 | Asano | ............... | H02K 1/17 |
| 2002/0079779 A1* | 6/2002 | Muszynski | ............... | H02K 1/148 |
| | | | | 310/216.061 |
| 2004/0095035 A1* | 5/2004 | Sogabe | ............... | H02K 1/146 |
| | | | | 310/216.092 |
| 2005/0099086 A1* | 5/2005 | Schunk | ............... | H02K 1/165 |
| | | | | 310/216.069 |
| 2005/0212374 A1* | 9/2005 | Mitcham | ............... | H02K 21/16 |
| | | | | 310/216.069 |
| 2010/0253176 A1* | 10/2010 | Ovrebo | ............... | H02K 3/493 |
| | | | | 310/216.073 |
| 2015/0263572 A1* | 9/2015 | Hyppias | ............... | H02K 1/148 |
| | | | | 310/83 |
| 2020/0358324 A1* | 11/2020 | Sugimoto | ............... | H02K 9/00 |

* cited by examiner

STATOR AND ELECTRIC MOTOR EQUIPPED WITH STATOR

CROSS-REFERENCE TO RELATED APPLICATIONS

This application is based upon and claims the benefit of priority from the Japanese Patent Application No. 2019-87416, filed May 7, 2019 the entire contents of which are incorporated herein by reference.

FIELD

Embodiments described herein relate generally to a stator and an electric motor equipped with the stator.

BACKGROUND

An electric motor such as a motor and a generator is provided with a stator that generates a rotating magnetic field and rotates a rotor. For example, as shown in FIG. 8, a stator 101 has a substantially cylinder-shaped stator core 103. On the inner peripheral surface of the stator core 103, for example, rectangular core teeth 105 are arranged in the circumferential direction. A coil 109 is inserted into a slot 107 between adjacent core teeth 105, and assembled to the core teeth 105.

When a current flows through the coil 109, heat is generated according to the resistance thereof, and the temperature of the coil 109 rises. If the temperature of the coil 109 rises excessively, the coil coating may be destroyed, and malfunctions such as short-circuiting and heat generation may occur. Therefore, it is necessary to cool the coil 109. Part of the cooling of the coil 109 is performed by dissipating heat to the stator core 103 through the core teeth 105.

In a structure in which the core teeth 105 each having a rectangular cross-section perpendicular to the central axis of the stator core 103 are uniformly arranged as shown in FIG. 8, since a coil 109 is, on its inner side, in contact with the core tooth 105, the heat dissipation is high; however, on the outer side of the coil 109, since a gap is formed between the coil 109 and the core tooth 105, heat dissipation will have decreased.

As shown in FIG. 9, there is also a structure in which core teeth 105 each having a rectangular cross-section and core teeth 106 each having a trapezoidal cross-section are alternately arranged in the circumferential direction on the inner peripheral surface of the stator core 103. In this structure, since the coil 109 comes on both sides into contact with the core teeth 105, high heat dissipation can be ensured.

From the viewpoint of heat dissipation, the alternating arrangement structure of the rectangular core teeth 105 and the trapezoidal core teeth 106 shown in FIG. 9 is more advantageous than the uniform arrangement structure of the rectangular core teeth 105 shown in FIG. 8. As shown in FIG. 10, since the distance between a permanent magnet 121 of the rotor 120 and the side surface of the trapezoidal core tooth 106 is smaller than the distance between the permanent magnet 121 and the side surface of the rectangular core tooth 105, magnetic attraction force F2 received by the trapezoidal core tooth 106 from the permanent magnet 121 of the rotor 120 is larger than magnetic attraction force F1 received by the rectangular core tooth 105 from the permanent magnet 121 of the rotor 120. Therefore, as shown in FIG. 11, the alternating arrangement structure of the rectangular core teeth 105 and the trapezoidal core teeth 106 has negative characteristics in that the cogging torque is larger than that of the uniform arrangement structure of the rectangular core teeth 105.

In the stator of an electric motor, the coil heat dissipation performance and the cogging torque are in a trade-off relationship.

CITATION LIST

Patent Literature

Japanese Unexamined Patent Application Publication (Translation of PCT Application) No. 2009-528811

SUMMARY OF INVENTION

Technical Problem

There is a need for a stator of electric motor that can suppress increase of cogging torque while ensuring heat dissipation of the coil.

Solution to Problem

A stator of an electric motor according to an aspect of the present disclosure has a cylinder-shaped stator core. First core teeth are arranged in the circumferential direction on the inner peripheral surface of the stator core. Second core teeth are alternately arranged with the first core teeth in the circumferential direction on the inner peripheral surface of the stator core. The second core teeth each have a cross-sectional shape of perpendicular to the central axis of the stator core different from the cross-sectional shape of each of the first core teeth. A coil is assembled to one of the first core teeth and the second core teeth. The width of each second core tooth is reduced with a step or a curved surface provided at the boundary between a tip end portion and a portion behind thereof.

According to this aspect, the coil can be brought into contact with the side surface of the first core tooth, and the coil can be brought into contact with the second core tooth in a portion behind the tip end portion, although the tip end portion of the second core tooth is spaced from the coil and cannot be brought into contact therewith. This enables improvement of the heat dissipation of the coil as compared with the case where a gap is formed between the coil and the second core tooth over substantially the entire area of the second core tooth.

Also, since the width of the tip end of the first core tooth is the same as the width of the tip end of the second core tooth, and the shape of the tip end portion of the second core tooth is the same as the shape of the tip end portion of the first core tooth, it is possible to approximate the magnetic attraction force between the second core teeth and the magnet of the rotor to the magnetic attraction force between the first core teeth and the magnet of the rotor. Thereby, the increase of the cogging torque can be suppressed.

Further, as a result of forming the tip end portion of the second core tooth into the same shape as that of the tip end portion of the first core tooth by trimming the side faces of the tip end portion of the second core tooth, instead of simply forming the tip end portions of the first and second core teeth into the same shape, the tip end portion of the second core tooth becomes thinner, thereby improving the workability of coil insertion.

DETAILED DESCRIPTION

Hereinafter, a stator according to the present embodiment, and an electric motor equipped with the stator will be described with reference to the drawings.

Figure 1:
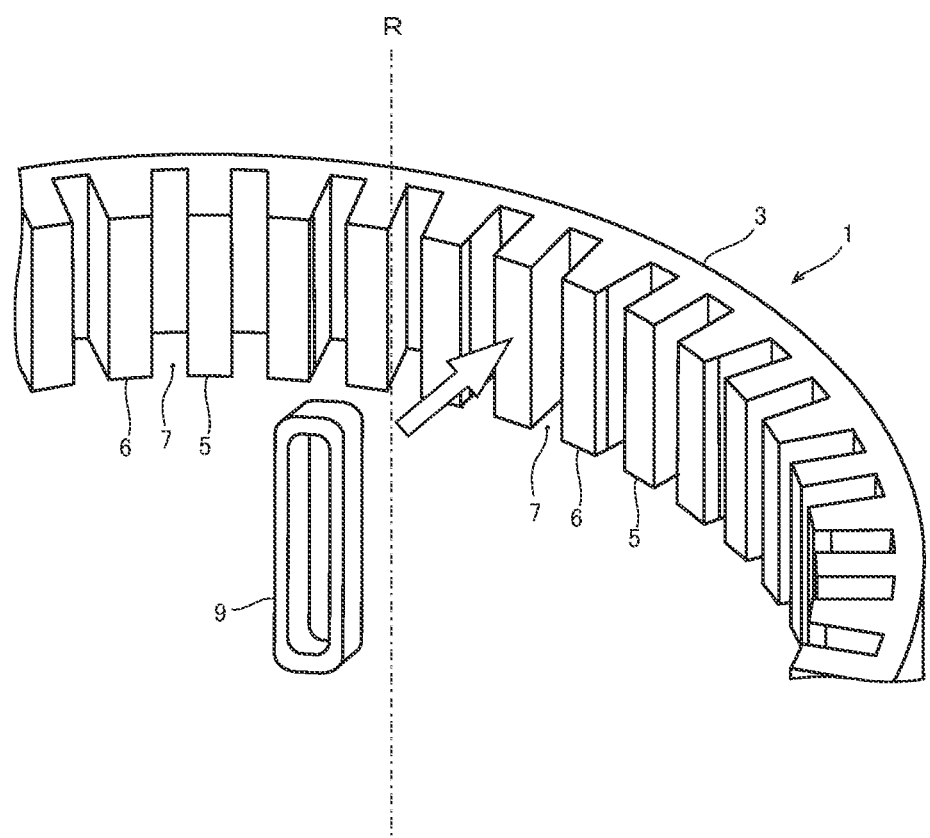
FIG. 1 is a perspective view of a portion of a stator of an electric motor according to one embodiment.
Figure 2:
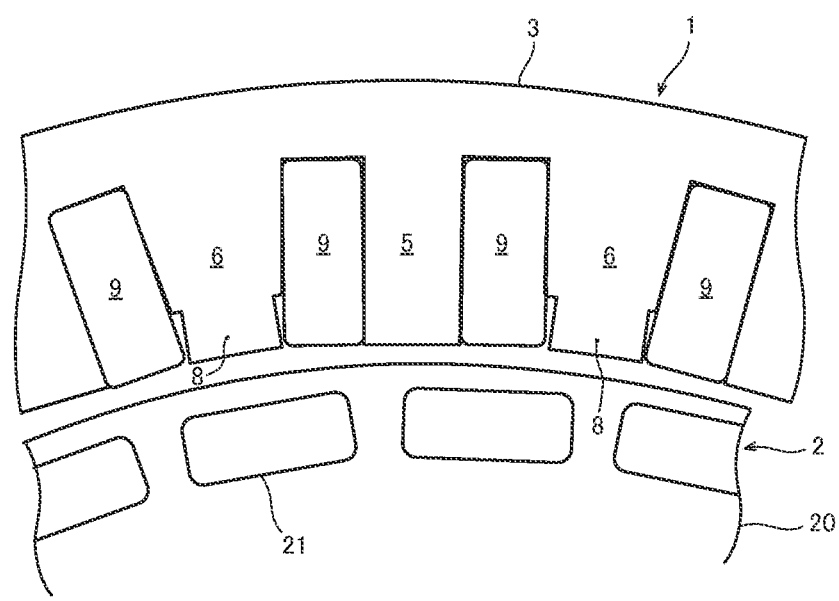
FIG. 2 is a cross-sectional view of a portion of the electric motor of FIG. 1.
Figure 3:
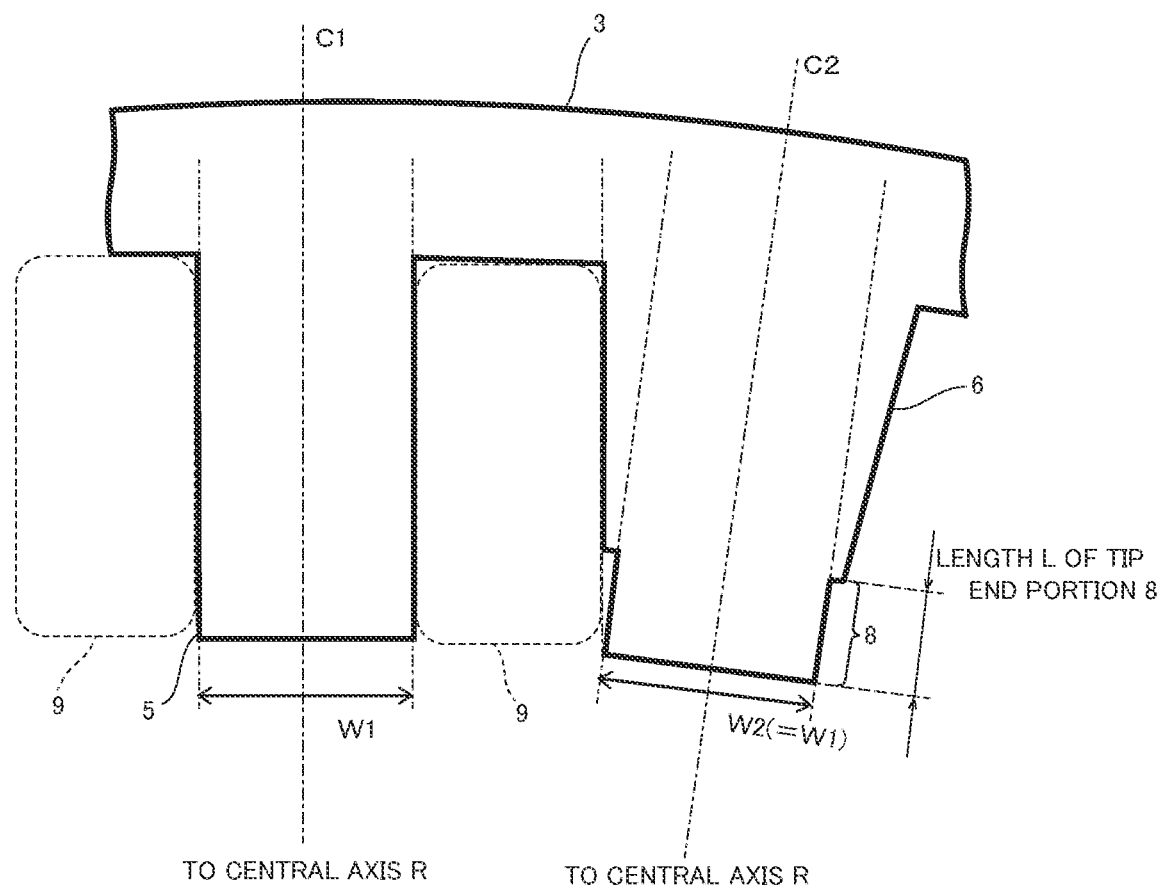
FIG. 3 is an enlarged cross-sectional view of a rectangular core tooth and a trapezoidal core tooth of FIG. 1.

As shown in FIGS. 1, 2, and 3, a stator 1 constitutes an electric motor together with a rotor 2 having a permanent magnet 21. The stator 1 has a substantially cylinder-shaped stator core 3, and the rotor 2 is accommodated inside the stator core 3. The rotor 2 includes a substantially column-shaped core 20 having a rotational shaft penetrating the center thereof, and permanent magnets 21 arranged at an equal interval in the circumferential direction of the core 20.

On the inner peripheral surface of the stator core 3, plural types, in this case, two types of first and second core teeth 5, 6 having different cross-sectional shapes perpendicular to a central axis R of the stator core 3 are provided to protrude toward the central axis R. The first core teeth 5 and the second core teeth 6 are alternately arranged in the circumferential direction of the stator core 3. The first core teeth 5 and the second core teeth 6 are arranged radially around the central axis R of the stator core 3 so that each center line C1, C2 coincides with the cylindrical radius. A coil 9 is inserted into a gap (slot) 7 between the first core tooth 5 and the second core tooth 6 and assembled to the first core tooth 5. The coil 9 may be assembled to the second core tooth 6.

The first core teeth 5 have the same shape and the same size with each other, and the second core teeth 6 also have the same shape and the same size with each other. The second core tooth 6 has a different shape with respect to the first core tooth 5. Typically, the cross-sectional shape of the first core tooth 5 perpendicular to the central axis R of the stator core 3 is rectangular. The width W1 of the tip end of the first core tooth 5 facing the rotor 2 is constant in the radially outward direction (the depth direction).

On the other hand, the second core tooth 6 is arranged to have a substantially trapezoidal cross-sectional shape such that the side face of the second core tooth 6 and the side face of the adjacent first core tooth 5 are parallel with each other, and a slot 7 therebetween forms a parallel slot. A width W2 of the upper base of the trapezoid is configured to be the same as the width W1 of the tip end of the first core tooth 5, and although the width is continuously narrowed from the lower base of the trapezoid toward the tip end, forming a trapezoidal shape, the width is reduced to a width W2 with a step in the middle way, and thereafter the width W2 continues to the tip end. The portion from the position where the width is narrowed with a step to the tip end is referred to as a tip end portion 8. In other words, in the second core tooth 6, both side faces thereof are slightly trimmed into a narrowed shape such that the width W2 of the tip end continues over a range to a predetermined depth, and the tip end portion 8 of the second core tooth 6 has the same shape and the same size as those of the tip end portion of the first core tooth 5. Although the boundary between the tip end portion 8 of the second core tooth 6 and the portion behind the second core tooth 6 has been described as being narrowed to the width W2 with a step, the boundary may be formed so as to be gradually narrowed to the width W2 with a curved surface.

As the coil 9, a rectangular coil is attached to the first core tooth 5. When assembled to the second core tooth 6, the coil 9 is a trapezoidal coil. Here, the former example will be described. In either case, one side face of the coil 9 is in contact with the side face of the first core tooth 5 over the entire area, while the other side face of the coil 9c is in contact with the second core tooth 6 in a portion behind the tip end portion 8. Note that, in practice, insulating paper is interposed between the coil 9, and the first and second core teeth 5 and 6.

Figure 4:
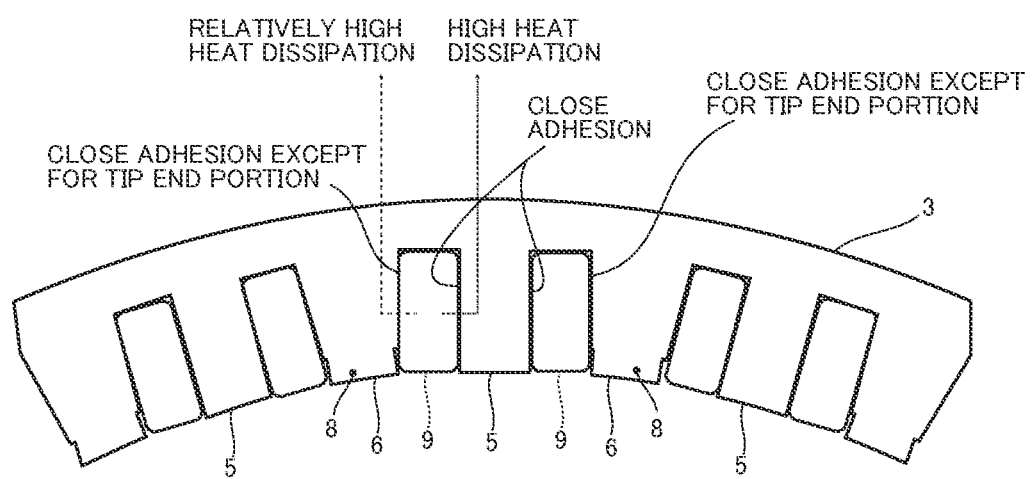
FIG. 4 is an explanatory supplementary diagram relating to coil heat dissipation of the stator according to the present embodiment.
Figure 8:
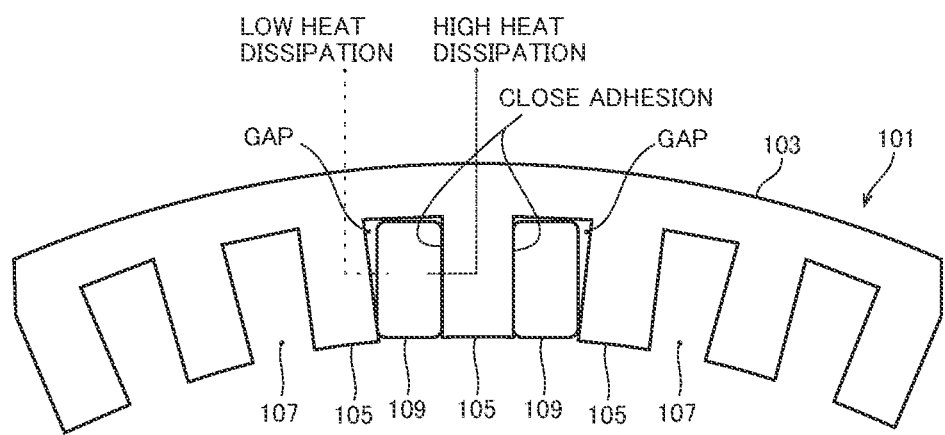
FIG. 8 is a supplementary explanation diagram regarding the heat dissipation of coil in a conventional uniform arrangement structure of rectangular core teeth.

Although, in the tip end portion 8 which is trimmed into a narrowed shape as shown in FIG. 4, a gap is formed and there is no contact between the coil 9 and the tip end portion 8, since the coil 9 is in contact with the side face of the second core tooth 6 in a portion radially outside (deeper side) of the tip end portion 8, heat dissipation of the coil 9 is improved compared to the structure in which a gap is formed and there is no contact between the coil 9 and the side face of the second core tooth 6 in the entire area thereof as shown in FIG. 8.

Figure 5:
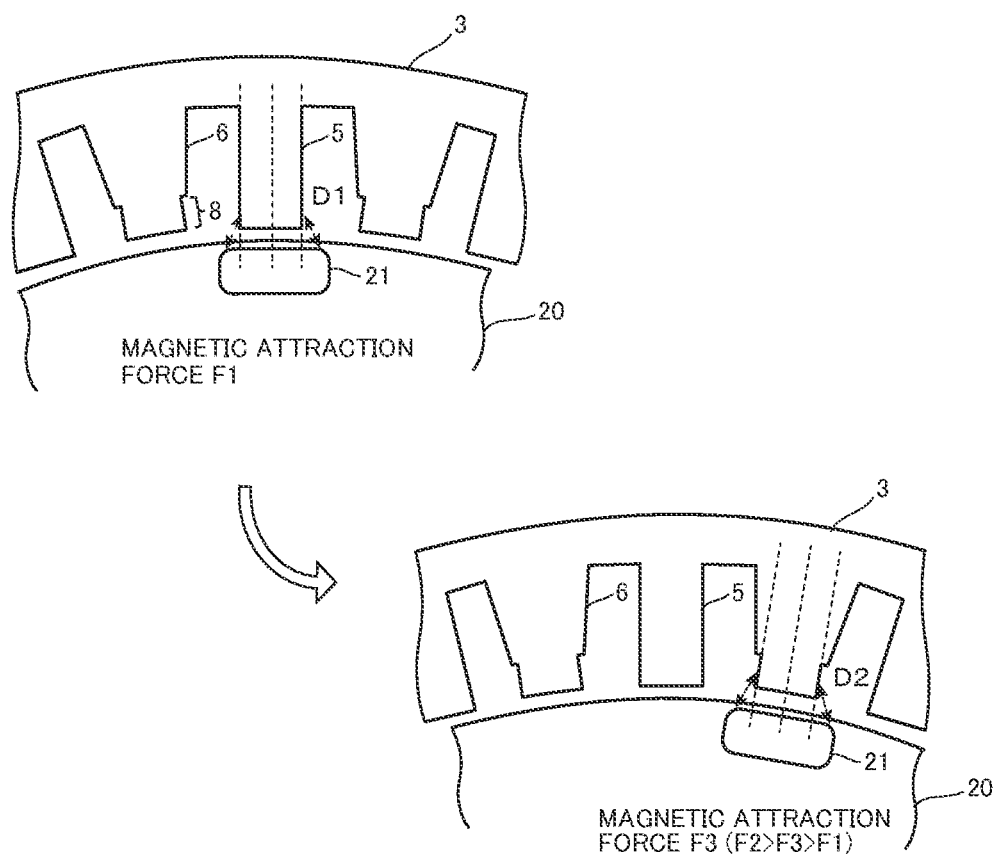
FIG. 5 is a diagram showing magnetic attraction force received by each of the trapezoidal core tooth and the rectangular core tooth of FIG. 1 from a permanent magnet of a rotor.

Also, since the first core tooth 5 has a rectangular cross-sectional shape, both side faces thereof as well as the center line C1 are parallel to the radius of cylinder, and similarly to that, in the second core tooth 6, only the tip end portion 8 thereof is parallel to the radius of the cylinder, and moreover the widths of both of the core teeth are equivalently configured. As shown in FIG. 5, when focusing on a certain position on a side face near the tip end of the first core tooth 5, the shortest distance D1 between the position of interest and the permanent magnet 21 when the rotor 2 is in a certain phase, and the shortest distance D2 between the same position as the position of interest on the side face near the tip end of the second core tooth 6 and the permanent magnet 21 become the same. This distance D2 decreases in accordance with the trimmed depth in comparison with that in the case of the structure of FIG. 9 in which both side faces of the tip end portion 8 of the second core tooth 6 are not trimmed into a narrowed shape. Therefore, even though the distance between the position of interest on the side face near the tip end of the first core tooth 5 and the permanent magnet 21 varies with the phase shift of the rotor 2, the variation of the distance between the corresponding position on the side face near the tip end of the second core tooth 6 and the permanent magnet 21 becomes substantially equivalent to the variation on the first core tooth 5.

Figure 9:
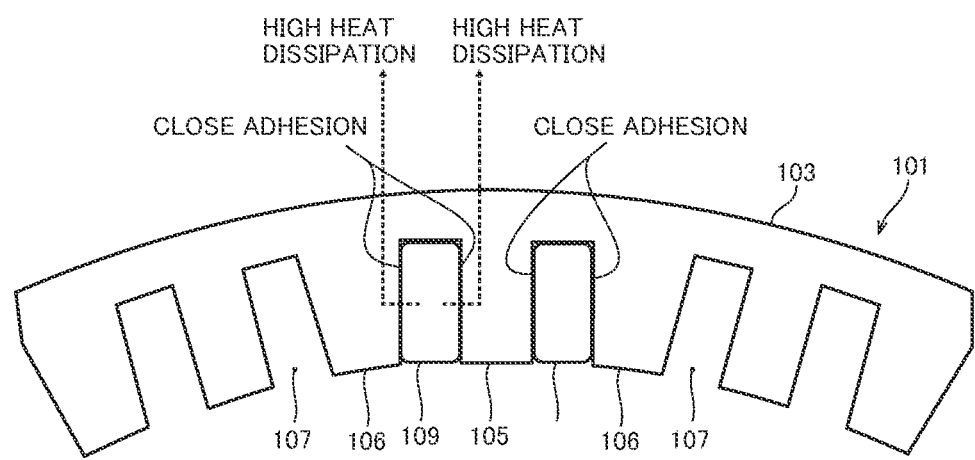
FIG. 9 is a supplementary explanation diagram regarding the heat dissipation of coil in a conventional alternating arrangement structure of rectangular core teeth and trapezoidal core teeth.
Figure 10:
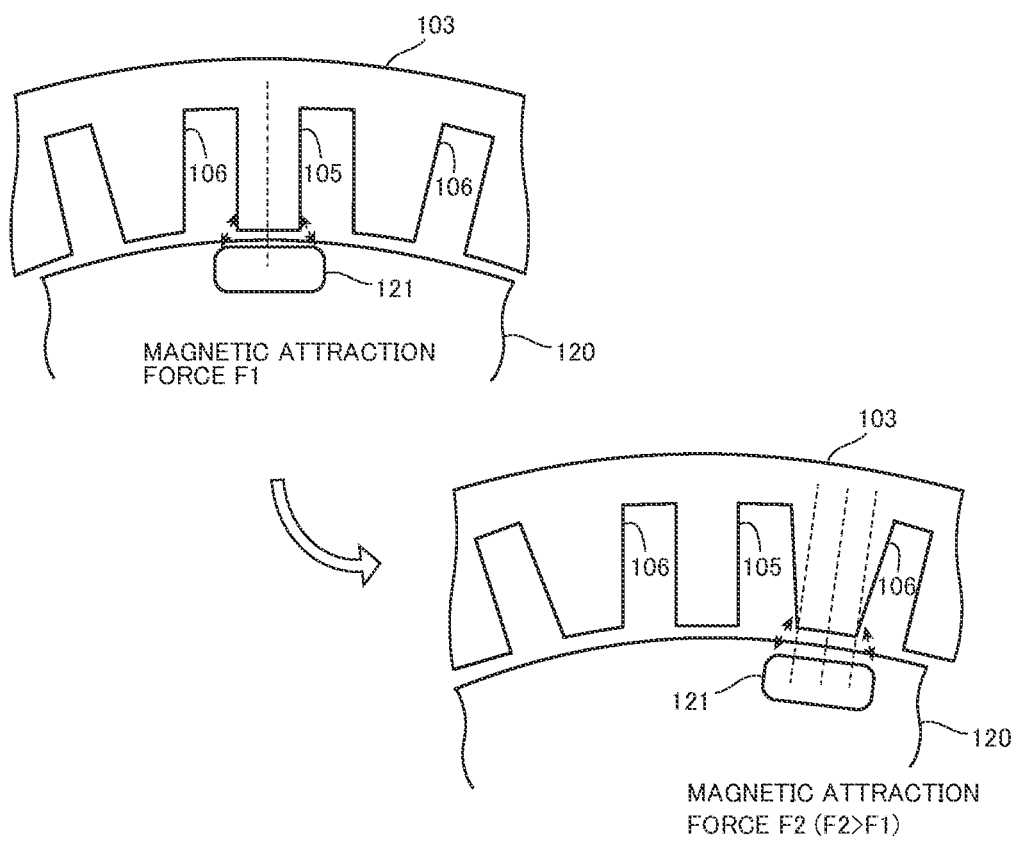
FIG. 10 is a diagram showing the magnetic attraction force between each of the trapezoidal core tooth and the rectangular core tooth of FIG. 9 and a permanent magnet of a rotor.
Figure 11:
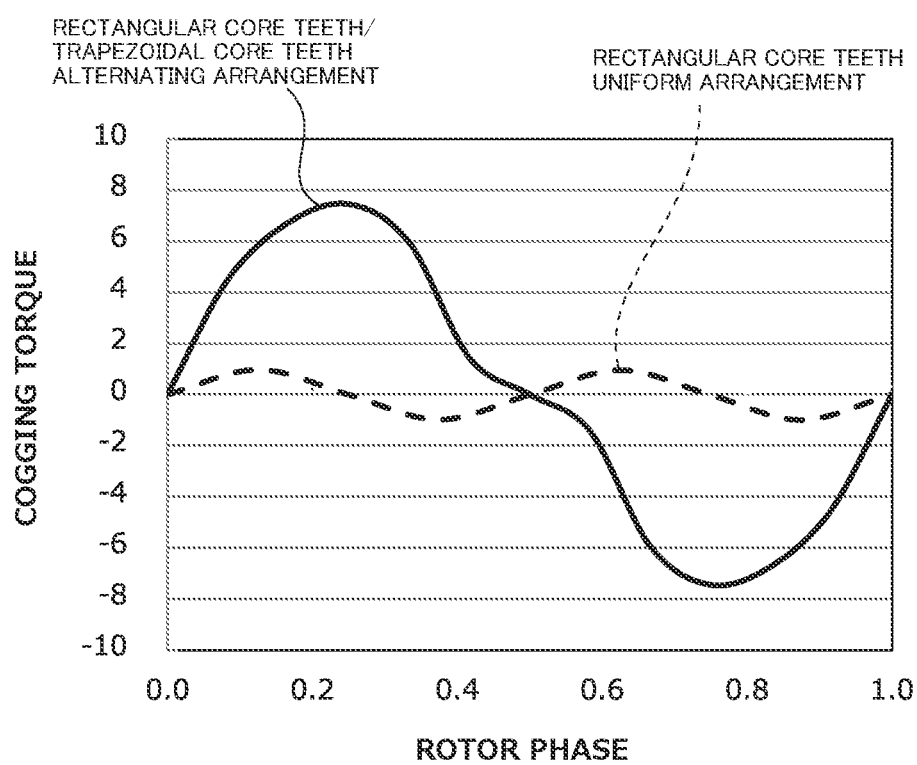
FIG. 11 is a diagram showing cogging torque by the stator of each of FIGS. 9 and 10.

Since magnetic attraction force is inversely proportional to the square of distance, the magnetic attraction force F3 received by the second core tooth 6 from the permanent magnet 21 is greater than the magnetic attraction force F1 received by the first core teeth 5 from the permanent magnet 21; however, it is smaller than the magnetic attraction force F2 in the case of the structure of FIG. 9.

Figure 6:
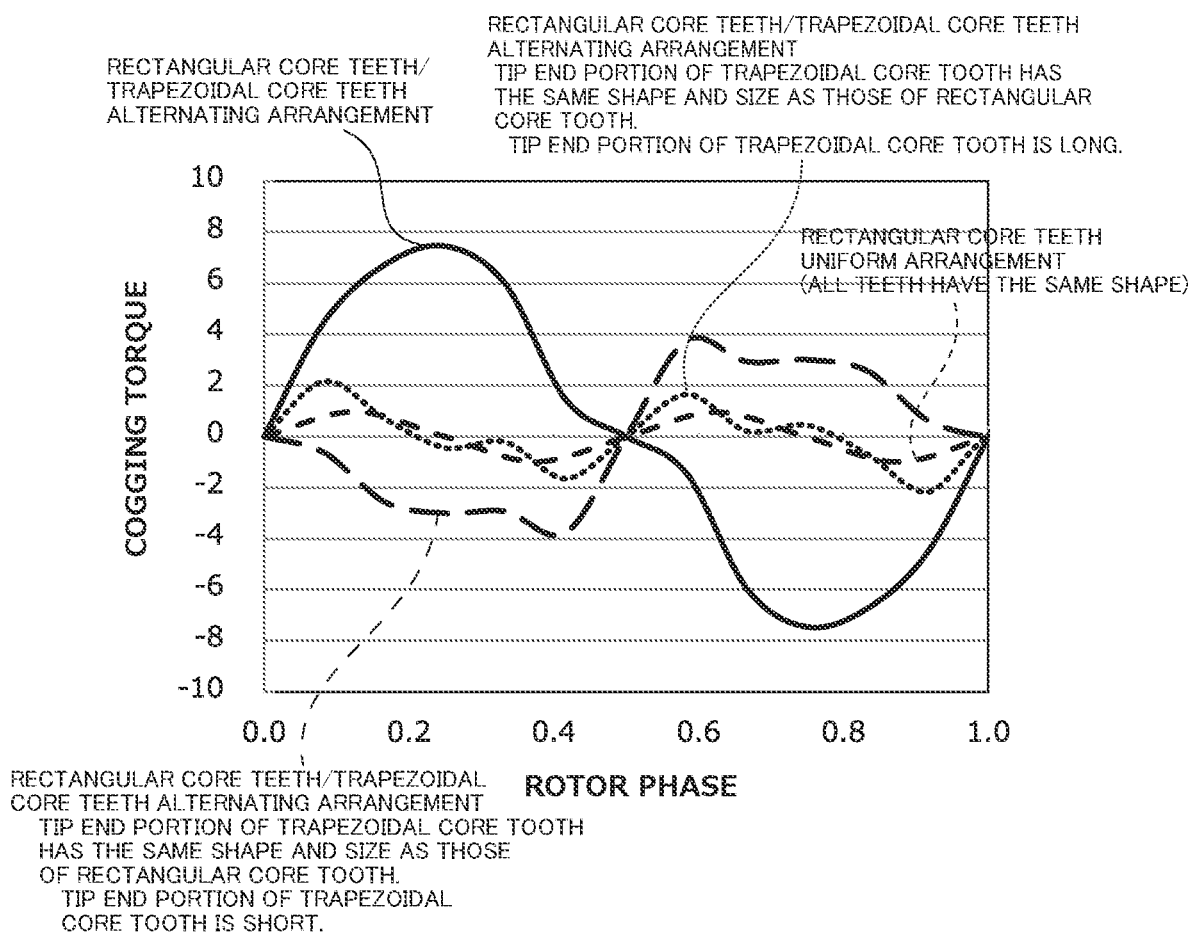
FIG. 6 is a diagram showing cogging torque by the stator according to the present embodiment.

Therefore, the cogging torque of the structure in which the rectangular first core teeth 5 and the trapezoidal second core teeth 6 having the tip end portion trimmed into a narrowed shape so as to form a rectangular cross section according to the present embodiment are alternately arranged as shown in FIG. 6 will become more than the cogging torque of the structure in which rectangular core teeth are uniformly arranged as shown in FIG. 8, but can be suppressed to be smaller than the cogging torque of the alternating arrangement structure of the rectangular core teeth and the trapezoidal core teeth having the tip end portion not trimmed into a narrowed shape as shown in FIG. 9.

Note that, by increasing the length of the tip end portion 8 of the second core tooth 6, the cogging torque can be more effectively suppressed from increasing, thereby being approximated to the cogging torque of a structure in which rectangular core teeth are uniformly arranged; however, on the contrary, the range where the coil 9 is in contact with the side face of the tip end portion 8 of the second core tooth 6 is narrowed, and the heat dissipation is reduced. The length L of the tip end portion 8 to be trimmed into a narrowed shape of the second core tooth 6 is determined in consideration of the balance between cogging torque and heat dissipation.

The cogging torque can also be suppressed in the case in which the tip end portion of the first core tooth 5 is expanded in the width into a trapezoidal shape without trimming the tip end portions 8 of the second core teeth 6 into a narrowed shape, thus configuring the tip ends of both of the core teeth to have the same shape and the same size. However, in the present embodiment, as a result of trimming the tip end portion 8 of the second core tooth 6 into a narrowed shape and configuring it to have the same shape and the same size as those of the tip end portion of the first core tooth 5, it becomes possible to increase the efficiency of the insertion operation of the coil 9.

Figure 7:
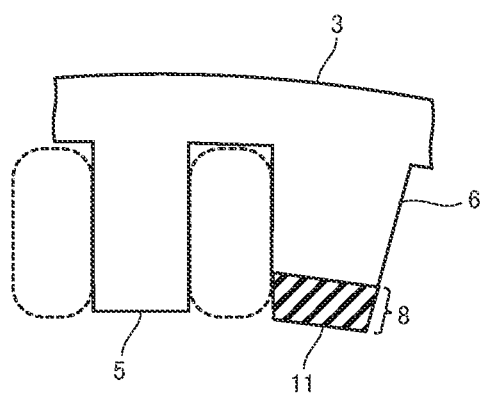
FIG. 7 is a diagram showing a cap for covering the trapezoidal core teeth of FIG. 1.

As shown in FIG. 7, the tip end portion 8 of the second core tooth 6 may be covered with a cap 11 in order to prevent the coil 9 from falling off. The material of the cap 11 is a non-magnetic resin so as not to affect the cogging torque, and more specifically, epoxy resin to which a filler such as $Al_2O_3$, AlN, BN, BeO, or the like is added to improve the thermal conductivity, EVA resin having elasticity, or other resin is used. The former can improve the heat dissipation, and the latter can effectively prevent the coil 9 from falling off. The cap 11 may be shaped in advance into a short cylindrical body having a truncated pyramid shape so as to fill a gap between the narrowed tip end portion 8 of the second core tooth 6 and the coil 9 to be put on the second core tooth 6, and thereafter the coil 9 may be inserted, or after the coil 9 is inserted into the first core tooth 5, the cap 11 may be injected into a gap between the narrowed tip end portion 8 of the second core tooth 6 and the coil 9, thereafter being cured.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A stator comprising:
a cylinder-shaped stator core;
first core teeth arranged in a circumferential direction on an inner peripheral surface of the stator core;
second core teeth which are alternately arranged with the first core teeth in the circumferential direction on the inner peripheral surface of the stator core, and which each have a cross-sectional shape perpendicular to a central axis of the stator core different from a cross-sectional shape of each of the first core teeth, and;
a coil which is assembled to one of the first core teeth and the second core teeth, wherein
a width of each second core tooth is reduced with a step or a curved surface at a boundary between a tip end portion and a portion behind of the tip end portion,
wherein the step comprises a convex and a concave, and the concave is disposed between the convex and the tip end portion.

2. The stator according to claim 1, wherein a width of a tip end of each second core tooth is the same as a width of a tip end of each first core tooth.

3. The stator according to claim 1, wherein the tip end portion of each second core tooth has the same shape and the same size as a shape and a size of a tip end portion of each first core tooth.

4. The stator according to claim 1, wherein the first core teeth each have a rectangular cross-sectional shape, and the second core teeth each have a trapezoidal cross-sectional shape.

5. The stator according to claim 4, wherein
the tip end portion of each second core tooth has the same width as a width of the tip end portion of each first core tooth, and the width continues over a predetermined depth length.

6. The stator according to claim 1, wherein the cross-sectional shape of each second core tooth is configured such that a slot between the first core tooth and the second core tooth is a parallel slot.

7. The stator according to claim 1, wherein the tip end portion of each second core tooth is covered with a cap of non-magnetic material.

8. The stator according to claim 7, wherein the cap is made of epoxy resin to which a filler of a specific material is added to improve thermal conductivity.

9. The stator according to claim 7, wherein the cap has elasticity.

10. An electric motor, comprising:
the stator according to claim 1; and
a rotor.

11. A stator, comprising:
a cylinder-shaped stator core;
plural types of core teeth which are arranged in a circumferential direction on an inner peripheral surface of the stator core, and which each have a different cross-sectional shape perpendicular to a central axis of the stator core; and a coil assembled to the core tooth, wherein in order that a tip end portion of a first core tooth among the plural types of core teeth has the same shape and the same size as a shape and a size of a tip end portion of a second core tooth, a width of the first core tooth is reduced with a step or a curved surface at a boundary between the tip end portion and a portion behind of the tip end portion, wherein the step comprises a convex and a concave, and the concave is disposed between the convex and the tip end portion.

* * * * *